United States Patent [19]

Lempicki et al.

[11] 4,371,965
[45] Feb. 1, 1983

[54] HIGH NEODYMIUM CONTENT ALUMINOPHOSPHATE GLASS AND LASER

[75] Inventors: Alexander Lempicki, Wayland; Richard M. Klein, Framingham, both of Mass.

[73] Assignee: GTE Laboratories Incorporated, Waltham, Mass.

[21] Appl. No.: 931,703

[22] Filed: Aug. 7, 1978

[51] Int. Cl.³ .............................................. H01S 3/17
[52] U.S. Cl. ............................................................. 372/40
[58] Field of Search .................. 331/94.5 E, 94.5 F; 106/47; 252/301.4 P

[56] References Cited

U.S. PATENT DOCUMENTS 4,134,851 1/1979 Klein et al. .................. 252/301.4 P Primary Examiner—William L. Sikes
Assistant Examiner—Leon Scott, Jr.
Attorney, Agent, or Firm—Jerry F. Janssen

[57] ABSTRACT

Miniature lasers comprise a high neodymium content aluminophosphate glass composition as the active lasing medium, disposed in an optical cavity defined by a first totally reflective mirror and a second partially transmissive mirror, and an optical pumping means which can be either a flashlamp or a light emitting diode.

The aluminophosphate glass laser material consists essentially of from 0.01 to 13 mole percent neodymium oxide, from 25 to 35 mole percent aluminum oxide, and from 60 to 70 mole percent phosphorus pentoxide.

5 Claims, 5 Drawing Figures

HIGH NEODYMIUM CONTENT ALUMINOPHOSPHATE GLASS AND LASER

BACKGROUND OF THE INVENTION

This invention relates to lasers. More particularly, it is concerned with aluminophosphate glass compositions containing high concentrations of trivalent neodymium ion, utilizable as active laser media and with lasers employing such media.

There has been considerable recent interest in attempts to produce small lasers which utilize stoichiometric neodymium compounds as the active laser media. These efforts have been reviewed by S. R. Chinn et al. in *Laser Focus*, pp. 64–69, May, 1976. Single crystals of such phosphate compounds as $LiNdP_4O_{12}$ and $NdP_5O_{14}$ have been tested as laser media. These compounds, known respectively as meta- and ultraphosphates, are examples of stoichiometric neodymium laser materials; that is, compounds in which neodymium forms one constituent of a stoichiometric formulation rather than merely a dopant.

These highly concentrated neodymium-containing laser media permit the construction of miniature lasers because of the large number of laser active sites per unit volume of the crystal. The neodymium content in $NdP_5O_{14}$, for example, is $4.0 \times 10^{21}$ ions $cm^{-3}$, roughly 30 times that found in neodymium-doped yttrium aluminum garnet (Nd:YAG) containing 1% neodymium. The high density of laser active sites in the stoichiometric neodymium phosphates causes laser pump radiation to be absorbed over short distances, typically 100 micrometers. The potential for minilaser applications in such fields as optical communications, handheld laser ranging devices, target designators, and the like is obvious.

The above compounds make use of particular crystalline lattice constraints which isolate neodymium ions to prevent self quenching at the high ion concentrations inherently present. The phosphate materials isolate Nd ions by typical distances of 0.5–0.7 nanometers by forming polymer chains in which the neodymium ions are separated by —O—P—O— linkages.

Single crystal laser media are often difficult and costly to produce. The success achieved with single crystal laser materials has, however, spurred efforts to produce glass laser media which contain high concentrations of laser active ions such as neodymium. The ease of fabrication and lower cost of glass laser materials make them attractive choices over single crystals for minilaser applications.

The search for an adequate host glass composition for high concentration neodymium laser media is complicated, however, by the number and variety of constraints which are placed upon the selection of a suitable glass host. In addition to possessing the desirable properties of chemical stability and resistance to attack by moisture and corrosive agents, the glass should be capable of incorporating high concentrations of neodymium ion without devitrification or substantial changes in its desirable physical properties. Moreover, the glass host should possess properties which minimize emission line broadening of the laser radiation and non-radiative energy losses. These problems arise as the inter-site separation of laser active sites decreases with increasing concentrations of lasing ion. Phosphate glasses meet many of these criteria, but also frequently suffer from problems characteristic of phosphate materials. For example, due to strong hydrogen bonding between phosphate and water, it is often difficult to exclude water from glass compositions containing large amounts of phosphate. In turn, the finished glass materials are often hygroscopic, or easily degraded by moist or slightly acidic environments.

Laser active glass compositions approaching the formulations of the metaphosphate stoichiometric compounds have been prepared as described by Y. K. Voron'ko et al. in *Sov. Phys. Dokl.*, 21, 146 (1976). These materials are somewhat limited in their usefulness as laser media, however, by emission line broadening and non-radiative energy losses which were attributed to the incorporation of water into the glass during fabrication. Techniques which have been employed to minimize water content in phosphate laser glasses during their fabrication include prolonged founding of the glass, vacuum founding, bubbling gases through the glass melt, and the incorporation of halide getters in the glass formulation. The minimum water content obtainable using these techniques is typically less than 0.2% as indicated by an infrared absorption coefficient of 6–8 $cm^{-1}$ at a wavelength of 3.45 $\mu m$.

A number of neodymium-containing phosphate glasses have been prepared in which the chemical stability and moisture resistance have been improved by incorporating an alkali or alkaline earth oxide into the glass. U.S. Pat. No. 3,979,322 issued to N. E. Alexeev et al. discloses a phosphate laser glass comprising phosphorus pentoxide, a laser active rare earth oxide, and oxides of the alkali or alkaline earth metals together with oxides of certain of the trivalent metals. As taught therein, the ratio of mono-, bi-, and trivalent metal oxides in total to phosphorus pentoxide exceeds unity.

According to the work of Deutschbein et al. in *Rev. de Phys. App.*, 2:29 (1967), the incorporation of small polyvalent cations in a phosphate laser glass medium tends to broaden the emission band of the laser radiation.

It is, therefore, an object of this invention to provide a high neodymium content high phosphate glass which is useful as an active laser medium.

It is a further object of this invention to provide a high phosphate laser glass which can be easily fabricated by methods which do not require special care to exclude water during glass fabrication.

It is still a further object of this invention to provide a high neodymium content aluminophosphate glass which is chemically stable and resistant to moisture.

It is a still further object of this invention to provide a high neodymium content high phosphate glass in which increased chemical stability and resistance to moisture is achieved without the incorporation therein of an alkali or alkaline earth metal oxide.

It is still a further object of this invention to provide a laser which can be miniaturized by employing as the active laser medium a high phosphate glass which contains concentrations of laser active ions which approach the concentrations found in single crystal stoichiometric laser compounds.

SUMMARY OF THE INVENTION

Laser glass compositions according to the present invention consist essentially of from about 0.01 mole percent to about 13 mole percent neodymium oxide, from about 25 mole percent to about 35 mole percent aluminum oxide, and from about 60 mole percent to about 70 mole percent phosphorus pentoxide. Laser glass compositions having a composition lying within the ranges specified have good chemical stability, resistance to attack by moisture, are easily fabricated by methods which do not require special techniques to exclude moisture, and have unexpectedly narrow laser emission bandwidths for glass compositions which include aluminum ions.

Lasers according to the present invention comprise an optical cavity defined by a first totally reflective mirror and a second partially transmissive mirror; a laser glass medium consisting essentially of neodymium oxide in amounts of from about 0.01 to about 13 mole percent, aluminum oxide in amounts of from about 25 to about 35 mole percent, and phosphorus pentoxide in amounts of from about 60 to about 70 mole percent; and an optical pumping means. Lasers according to the present invention can be fabricated in small size (minilasers) due to their incorporation of a laser medium which has a high concentration of lasing ion per unit volume.

For a better understanding of the present invention together with other and further objects, advantages, and capabilities thereof, reference is made to the following disclosure and appended claims in connection with the above-described drawings.

DETAILED DESCRIPTION

High neodymium content aluminophosphate glass compositions utilizable as active laser media according to the present invention consist essentially of mixtures of neodymium oxide, aluminum oxide, and phosphorus pentoxide. Aluminum hydroxide or, preferably aluminum nitrate, is mixed with water, phosphoric acid and neodymium oxide and the mixture is subjected to a glass forming process detailed in the Examples below. The initial ratio of aluminum to phosphorus in the mixture, as defined by the atom ratio of the two elements, is chosen initially to be approximately 1 to 3 to account for losses of phosphorus pentoxide which occur during the founding of the glass.

Figure 1:
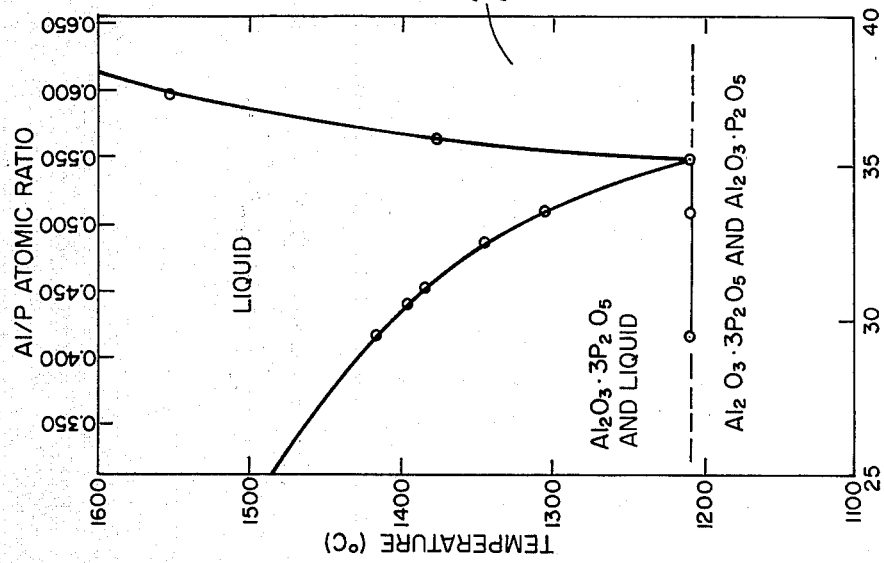
FIG. 1 is a representation of the binary composition diagram for the $Al_2O_3 \cdot 3P_2O_5$-$Al_2O_3 \cdot P_2O_5$ system to aid in understanding the specification.

As can be seen by examining FIG. 1, an eutectic mixture of aluminum oxide and phosphorus pentoxide is formed at about 35 mole percent alumina and at a temperature slightly above 1200° C. At compositions lying on the phosphate-rich side of this point in the composition diagram shown in FIG. 1, there is a much less steep rise in melting point than is true for compositions lying on the alumina-rich side of the eutectic point. By choosing mixtures of aluminum oxide and phosphorus pentoxide in which the atom ratio of aluminum to phosphorus is approximately 1 to 3, the initial composition of the glass forming mixture has a composition lying on the phosphate-rich side of the eutectic point. As the mixture is heated to form a glass, loss of phosphorus pentoxide causes the composition of the glass forming mixture to move toward the eutectic point. With the change in composition caused by volatilization of $P_2O_5$, the melting point of the mixture falls. Care must be exercised that the composition of the glass forming mixture does not change to a point beyond the eutectic point of the composition diagram, that is, to a composition having more than 35 mole percent aluminum oxide. The steep rise in melting point of the mixture beyond this point will cause increased volatilization of phosphorus pentoxide as the temperature is raised to keep the glass forming mixture molten during founding of the glass. Thus, the final composition of the glass is best controlled if throughout the process of forming the glass, the composition lies in the region lying to the left of the eutectic point as shown in FIG. 1.

Figure 2:
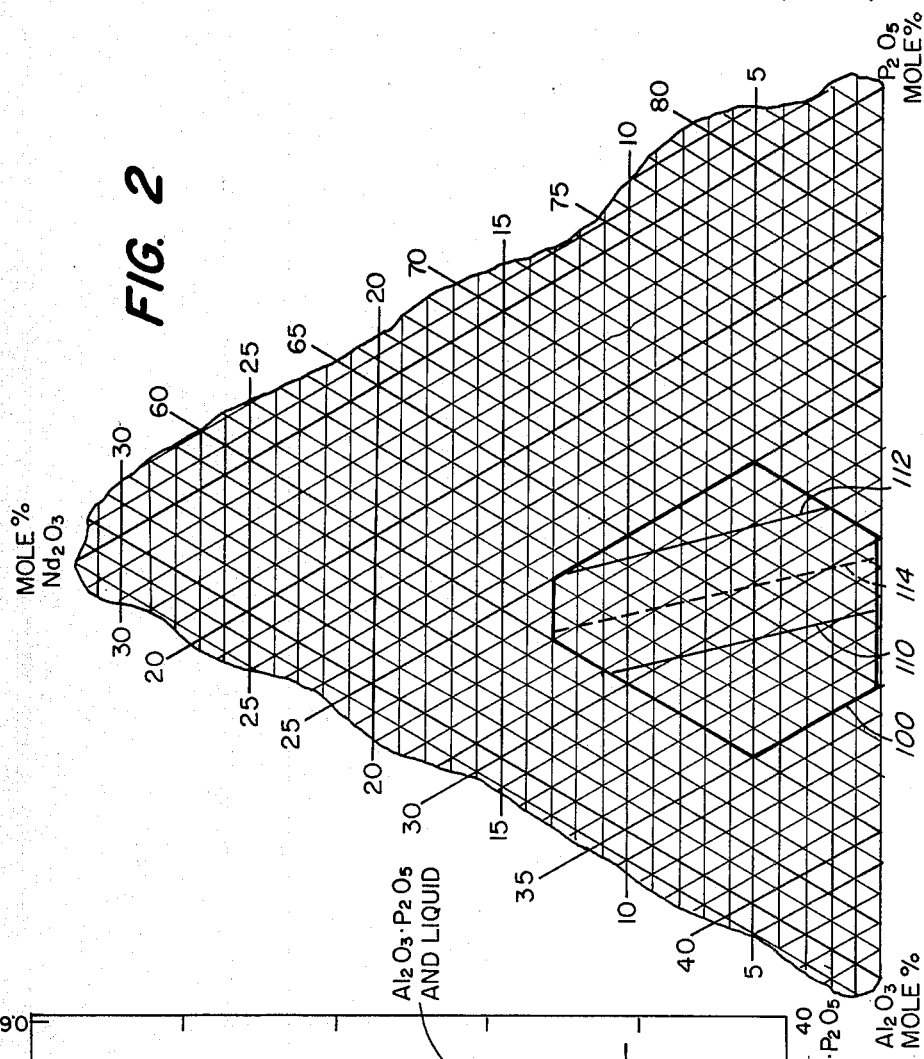
FIG. 2 is a ternary composition diagram for the $Al_2O_3 \cdot P_2O_5 \cdot Nd_2O_3$ system showing the glass forming region of glass compositions according to the invention.

Specific compositions for laser glass materials according to the present invention are shown by the ternary composition diagram represented in FIG. 2. As indicated there, the region of composition defining laser glass materials according to the present invention is indicated by the bold line 100 setting out a region of the ternary $Nd_2O_3 \cdot Al_2O_3 \cdot P_2O_5$ system in which stable glass compositions form. Glass compositions having from about 0.01 mole percent ($\sim 0.03$ weight percent) to about 13 mole percent ($\sim 28$ weight percent) neodymium oxide, from about 25 mole percent ($\sim 16$ weight percent) to about 35 mole percent ($\sim 26$ weight percent) aluminum oxide, and from about 60 mole percent ($\sim 54$ weight percent) to about 70 mole percent ($\sim 76$ weight percent) phosphorus pentoxide lie within the region of glass compositions according to the present invention. It has been found that incorporation of more than about 13 mole percent neodymium oxide in the ternary mixture leads to compositions which tend to crystallize upon cooling.

Any glass having a composition lying within the region defined by line 100, or the mole % values above, is within the scope of glass compositions of the present invention. However, it is preferred that the atom ratio of aluminum to phosphorus in the final glass composition lie in the region between 0.40 and 0.48; that is in the region bounded by line 100 of FIG. 2, and between lines 110 and 112. The greatest stability of final glass compositions is found for glasses whose compositions lie within these bounds. The ratio of aluminum to phosphorus in the final glass composition can be controlled by selection of the amounts of aluminum compound and phosphorus pentoxide used in the initial glass forming mixture and by controlling the amount of phosphorus pentoxide lost through volatilization by careful adherence to a schedule of heating steps during founding of the glass.

Optimum glass compositions for laser glass use are formed, according to the present invention, wherein the atom ratio of aluminum to phosphorus in the finished glass is about 0.44 and the amounts of the three components of the glass lie within the mole percentage ranges specified above. Again referring to FIG. 2, the optimum glass compositions according to the present invention lie within the region bounded by the line 100, and along or near the line 114. Specific examples of three glass compositions according to the present invention containing varying amounts of neodymium oxide are given in the Examples below. Following the three Examples is an alternative method of forming glass compositions according to the present invention.

EXAMPLE I

A laser glass sample designated Sample 1 was prepared by mixing 17.75 ml of 12.8 molar phosphorus pentoxide (equivalent to 16.14 gm or 0.1137 mole of $P_2O_5$) and 150 ml of water. This mixture was heated to 90° C. with stirring. To the heated and stirred mixture were added 5.91 gm of aluminum hydroxide (equivalent to 3.86 gm or 0.0379 mole of $Al_2O_3$) and 0.510 gm (0.0015 mole) of neodymium oxide. This mixture contained aluminum and phosphorus in an initial atom ratio of 0.33. The mixture was heated until the initial volume had been reduced by about 4/5 through evaporative losses. The residue from this step was transferred to an alumina crucible and subjected to the following schedule of glass founding steps:

(a) heat to 190° C. at a rate of 0.5° C./minute
(b) heat at 190° C. for 80 minutes
(c) heat to 440° C. at a rate of 1.1° C./minute
(d) heat to 700° C. at a rate of 2.0° C./minute
(e) heat at 700° C. for 80 minutes
(f) cool to room temperature
(g) heat to 1500° C. at a rate of about 6° C./minute
(h) heat at 1500° C. for one hour
(i) pour glass melt into a graphite mold and cool to room temperature
(j) anneal glass by conventional techniques.

The finished glass sample weighed 16.51 gm and had a density of 2.587 $gm/cm^3$. About 4.0 gm of phosphorus pentoxide had been lost from the initial mixture through volatilization during the glass founding steps. The aluminum to phosphorus atom ratio in the final glass composition was about 0.44. The glass sample contained 1.2 mole percent (3.1 weight percent) of neodymium oxide which corresponded to a $Nd^{3+}$ concentration of $2.9 \times 10^{20}$ ions/$cm^3$ in the finished glass.

EXAMPLE II

A laser glass sample designated Sample 2 was prepared by a method similar to that detailed above in Example I with the exception that the initial glass forming mixture contained 1.53 gm (0.0046 mole) of neodymium oxide. Founding of the glass followed the schedule of steps (a) through (j) detailed above. However, after cooling the sample to room temperature in step (i) and prior to heating to 1500° C. in step (j), the glass sample was thoroughly mixed.

The finished glass sample weighed 17.53 gm and had a density of 2.627 $gm/cm^3$. As in Example I, founding of the glass resulted in the loss of about 4.0 gm of phosphorus pentoxide from the initial glass forming mixture, resulting in a final glass composition in which the aluminum to phosphorus atom ratio was about 0.44. The finished glass sample contained 3.6 mole percent (8.7 weight percent) neodymium oxide which corresponded to a $Nd^{3+}$ concentration of $8.2 \times 10^{20}$ ions/$cm^3$ in the finished glass.

EXAMPLE III

A glass sample designated Sample 3 was prepared by a method similar to that detailed in Example I above with the exception that the initial glass forming mixture contained 5.91 gm (0.0176 mole) of neodymium oxide. Founding of the glass followed the schedule of steps (a) through (j) detailed above. However, in step (d) the glass sample was heated to 1000° C. at a rate of 2° C. minute, and in step (e) the glass sample was heated at 1000° C. for 80 minutes.

The finished glass sample weighed 21.91 gm and had a density of 2.770 $gm/cm^3$. As in Example I, about 4.0 gm of phosphorus pentoxide had been lost from the glass mixture during the founding of the glass resulting in a final composition which had an aluminum to phosphorus atom ratio of about 0.44. The final glass composition contained 12.5 mole percent (27 weight percent) neodymium oxide which corresponded to a $Nd^{3+}$ concentration of $2.7 \times 10^{21}$ ions/$cm^3$ in the final glass.

EXAMPLE IV

An alternative method of preparing laser glass materials according to the present invention comprises the following steps.

A mixture of 12.0 ml of 15.05 molar phosphoric acid, 29.4 ml of 2.16 molar aluminum nitrate, and about 25 ml of water is heated with stirring until the original volume has been reduced to about ½. To this mixture is added an amount of up to about 10 gm of neodymium oxide. The initial atom ratio of aluminum to phosphorus in this glass forming mixture is about 0.35.

This mixture is transferred to an alumina crucible and subjected to the following schedule of glass forming steps:

(a) heat to 190° C. at a rate of 0.5° C./minute
(b) heat at 190° C. for 80 minutes
(c) heat to 440° C. at a rate of 1.1° C./minute
(d) heat to 700° C. at a rate of 2.0° C./minute
(e) heat at 700° C. for 80 minutes
(f) cool to room temperature
(g) heat to 1450° C. at a rate of about 8° C./minute
(h) heat at 1450° C. for 45 minutes
(i) pour glass melt into a graphite mold and cool to room temperature
(j) anneal glass by conventional techniques.

Laser glass samples prepared by the methods detailed above possess a number of desirable characteristics for applications in lasers. The glass samples have been found to have good chemical stability, and resistance to attack by moisture and mildly acidic environments. One sample was allowed to stand for a period of several months in a reasonably moist laboratory environment and showed no signs of degradation of the polished glass surface after this treatment.

The aluminophosphate glass host is capable of incorporating up to about 13 mole percent neodymium without any appreciable change in the chemical stability of the glass. The neodymium oxide concentration can likewise be as low as 0.01 mole percent. However, for use as a lasing medium for minilaser applications, the glass should contain neodymium oxide in the higher concentration range, generally above about 10 mole percent. The glass samples which were prepared as described above contained very little water as determined by infrared analysis. The absorption coefficient at 3.45 $\mu$m was about 8 $cm^{-1}$ which compares favorably with the value obtained by prior art techniques as discussed hereinabove, obtained only after special founding techniques. This is surprising since water is a major component of the original glass forming mixtures.

Glass compositions according to the present invention which contain neodymium ion in amounts near the upper range limit of 13 mole percent contain lasing ion concentrations close to those found in the stoichiometric neodymium laser compounds. However, the ease with which the glass materials can be formed makes them desirable alternatives to the stoichiometric compounds for minilaser applications.

Laser Properties

The laser properties of the glass samples prepared as described above were determined by constructing a laser using the glass samples as the active lasing medium. The laser samples were small plates 5 mm × 5 mm cut from cast buttons of the glass. The laser sample cut from glass Sample 2 was 0.640 mm thick, and that cut from glass Sample 3 was 0.307 mm thick.

Figure 3:
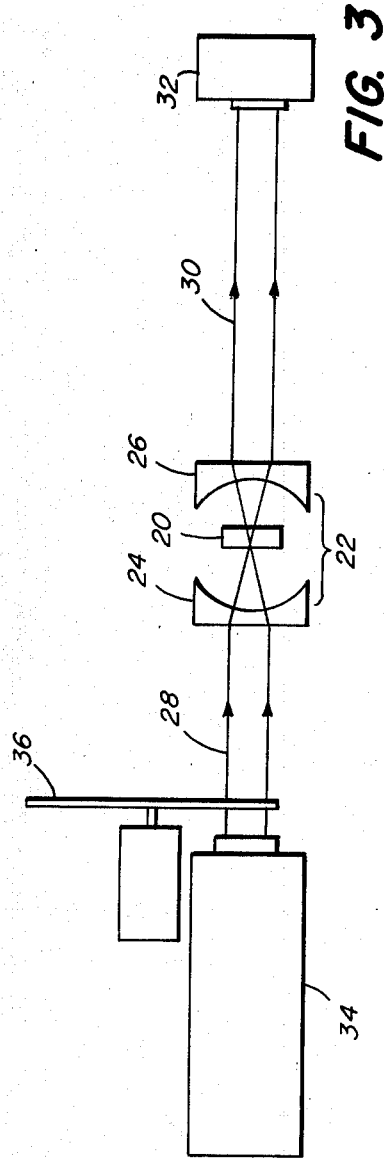
FIG. 3 is a schematic representation of a collinearly pumped laser employed experimentally to determine the laser properties of glass compositions according to the invention.

Referring to FIG. 3, the laser glass plate 20 was mounted in a nearly concentric 10 cm long cavity 22 defined by a first spherical mirror 24 which was transparent to the laser pump radiation 28, but totally reflective to the laser emission radiation 30, and a second spherical mirror 26 alterable to have 0.2, 1.0, and 2.5 percent transmittance at the wavelength of the laser emission 30.

The glass laser samples were mounted at the center of the optical cavity 22 at the laser mode waist. The glass samples were collinearly excited by focusing light of 583 nanometers wavelength from a CW rhodamine 6 G tunable dye laser 34 through the first mirror 24 onto the glass sample 20. The pump radiation 28 was chopped by means of a rotating chopper 36 to produce 500-600 microsecond pulses of pump radiation. The pulses were found to be long enough to reach the fluorescence steady state in the laser glass sample within the duration of each pulse.

The output power of the laser was measured for each glass laser sample using a calibrated photodiode 32. For the laser configuration having a 0.2 percent transmissive output mirror, the threshold pump power for laser glass samples 2 and 3 was found to be 3.5 and 9.0 milliwatts, respectively. These values compare favorably with threshold pump power requirements for lasers employing stoichiometric neodymium single crystal materials as the active laser medium.

Figure 4:
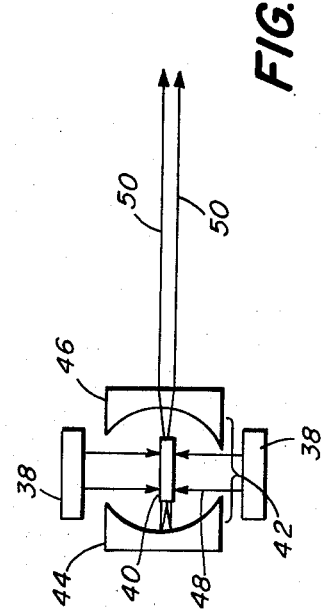
FIG. 4 is a schematic representation of a laser in accordance with the invention.

In a laser according to the invention as presented in FIG. 4, there is shown schematically a miniature laser in which the laser glass sample is pumped laterally. The active laser glass medium 40 is mounted in the center of an optical cavity 42 defined by a first totally reflective mirror 44 and a second partially transmissive mirror 46. The laser glass sample 40 which can take the form of a rod with a diameter as small as 1 mm, is optically pumped in a lateral fashion by means of a source of light 38 which may be a flashlamp, or alternatively, one or more light emitting diodes. One advantage of lasers constructed according to the present invention which employ high neodymium content aluminophosphate glass laser media, is the ease with which very small laser rods can be pumped laterally with non-coherent light. The broad absorption band of the neodymium containing laser glass according to the present invention at wavelengths between about 560-610 nanometers makes efficient optical pumping with white light possible even when the transverse dimension of the rod is less than 1 mm.

Lasers employing such small glass laser rods, pumped laterally, can be made quite small by the expedient of mirroring the ends of the laser glass rod. In that case, the mirrors 44 and 46 of FIG. 4 take the form of mirrored ends of the laser glass sample rod 40. The opposite ends of the laser glass sample, in the form of a rod of small diameter, parallel to one another and normal to the lasing axis are polished and converted to the necessary mirrors by mirroring techniques well known to the laser art.

Figure 5:
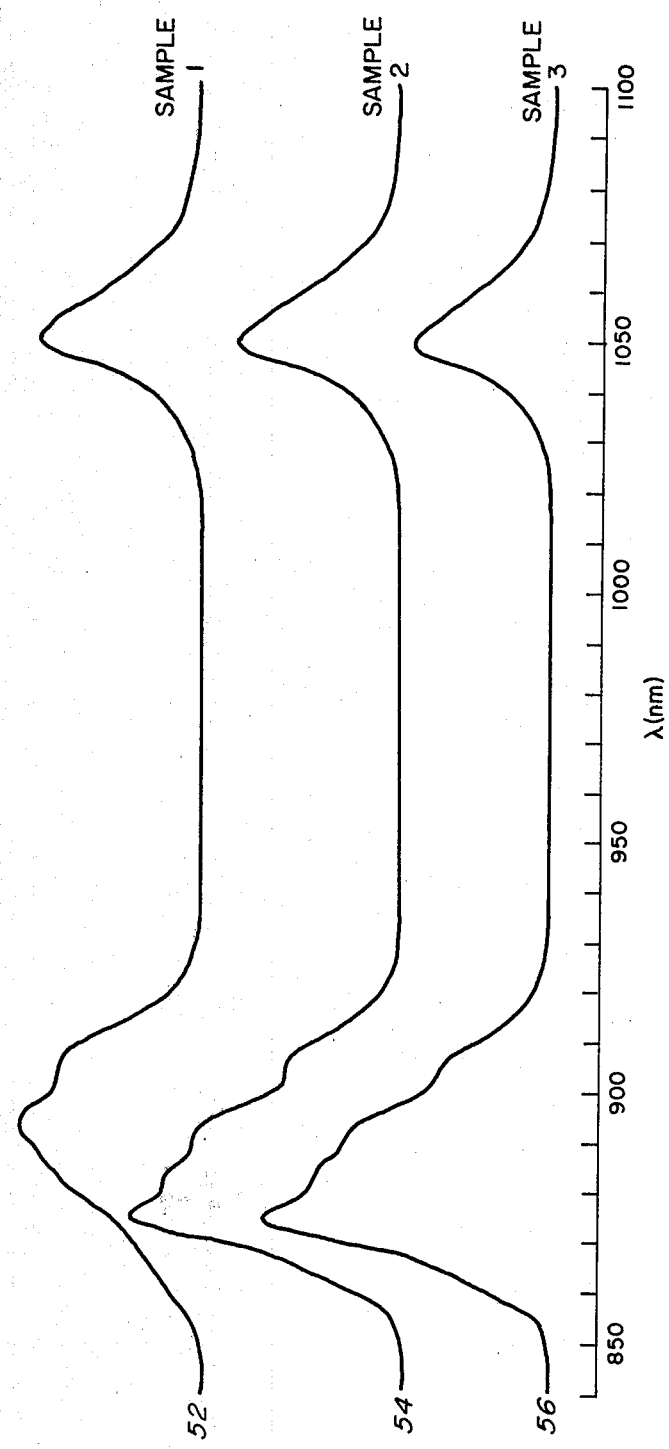
FIG. 5 shows the laser emission spectra for glass laser samples according to the invention.

In FIG. 5 there are shown the laser emission spectra of glass samples 1, 2 and 3 according to the present invention, as curves 52, 54 and 56, respectively. The emission band at 1050 nanometers wavelength is especially useful in optical fiber communications applications because of the low light transmission losses which occur at this wavelength.

The radiative lifetime for laser glass samples according to the present invention was found to be approximately 446 microseconds. This value is comparable to that found for many of the phosphate glass laser materials known to the art. However, the half bandwidth for laser emission of 28.8 nanometers is lower than that obtained for the lithium containing metaphosphate glasses. This result is surprising since it is generally understood that the inclusion of polyvalent cations within a laser glass composition tends to broaden the emission wavelength band. The cross-sectional area for stimulated radiation for glass laser materials according to the present invention was found to be about $2.7 \times 10^{-20}$ cm$^2$.

While there has been shown and described what is at present considered the preferred embodiments of the invention, it will be obvious to those skilled in the art that various changes and modifications can be made therein without departing from the scope of the invention as defined by the appended claims.

What is claimed is:

1. A laser comprising
    an optical resonance cavity defined by a first totally reflective mirror and a second partially transmissive mirror,
    a glass laser medium disposed within said optical resonance cavity, said glass laser medium consisting of from about 0.01 mole percent to about 13 mole percent neodymium oxide, from about 25 mole percent to about 35 mole percent aluminum oxide, and from about 60 mole percent to about 70 mole percent phosphorus pentoxide, and
    an optical pumping means disposed adjacent to said optical resonance cavity for exciting said glass laser medium to emit stimulated radiation.

2. The laser of claim 1 wherein said glass laser medium contains aluminum oxide and phosphorus pentoxide in amounts to provide an atom ratio of aluminum to phosphorus of from about 0.40 to about 0.48.

3. The laser of claim 2 wherein said neodymium oxide is present in an amount of at least 10 mole percent.

4. The laser of claim 1 wherein said optical pumping means comprises a flashlamp.

5. The laser of claim 1 wherein said optical pumping means comprises at least one light emitting diode.

* * * * *